United States Patent Office 3,169,114
Patented Feb. 9, 1965

3,169,114
LUBRICANTS
Bill Mitacek and John P. Graham, Bartlesville, Okla.,
assignors to Phillips Petroleum Company, a corporation of Delaware
No Drawing. Filed Jan. 3, 1961, Ser. No. 80,029
The portion of the term of the patent subsequent to
Nov. 26, 1980, has been disclaimed and dedicated to
the Public
8 Claims. (Cl. 252—59)

This invention relates to improved lubricants and in particular to bodied lubricants such as greases and to their method of manufacture.

Up to the present time the most successful commercial greases for general purpose automotive lubrication have been prepared from lubricating oils with metal salts of fatty acids as the thickening agent. The lithium soap greases, those containing the lithium salt of 12-hydroxystearic acid, have been especially outstanding in such properties as work stability. Various synthetic thickeners, e.g., certain polymeric materials, have been suggested as replacements for soaps in grease compositions but by and large such materials do not stand up under the rigorous conditions of machine lubrication. For example, polyethylene prepared by the process of Fawcett et al., U.S. 2,153,533, has been tried as a grease component and although the resulting products were suitable for salves or medicinal purposes (U.S. 2,628,127) they have not proven to be satisfactory for lubricating machinery.

One of the objections to the use of high molecular weight or normally solid polymers in greases has been their low solubility in hydrocarbon oils. Many methods have been proposed for employing high molecular weight polymers in greases but in general such greases formulated with polymers according to the prior art serve merely to form a gel with the lubricating oil and this gel quickly breaks down to a relatively fluid consistency when the composition is subjected to mechanical working.

We have discovered that improved lubricants can be prepared from lubricating oil and polypropylene having a density between 0.890 and 0.920 gram per cubic centimeter at 25° C. wherein the polypropylene is dispersed in the oil at an elevated temperature and subsequently the resulting mixture is milled at a temperature in the range of 150 to 245° F. This method is particularly useful in preparing soapless greases which exhibit very good work stability and have outstanding endurance life at high loads. The greases of this invention also have a high drop point.

It is an object of this invention to provide an improved lubricant.

Another object of this invention is to provide a method of employing relatively high density polypropylene as a thickening agent in the manufacture of greases.

Another object of the invention is to provide a bodied lubricant which has good work stability and long life under conditions of high load.

Other objects, advantages and features of the invention will be apparent to those skilled in the art from the following discussion.

The propylene polymers which are employed in manufacturing the grease compositions of this invention are the highly crystalline polymers which result from the polymerization of propylene over organometallic catalyst. An example of a suitable catalyst system for preparing these highly crystalline polymers is the combination of a trialkylaluminum with titanium trichloride, or a more specifically triethylaluminum and titanium trichloride. The crystalline polypropylenes which are employed in these greases will generally have an isotactic content as measured by the portion of the polymer which is insoluble in refluxing normal heptane of above 85 percent by weight.

As stated above, the polypropylenes which are employed in the greases of this invention have a density at 25° C. of between 0.890 and 0.920 gram per cubic centimeter. The densities as specified herein are measured by compression molding the polymers at 350° F. until completely molten, followed by cooling to 200° F. at a rate of about 10° F. per minute. Water is then circulated through the mold jacket to continue the cooling to 150° F. at a rate not exceeding 20° F. per minute. The polymer is then removed from the mold and cooled to room temperature. Density is then determined by placing a smooth, void-free, pea-sized specimen cut from a compression molded slab of the polymer in a 50 ml., glass-stoppered graduate. Carbon tetrachloride and methylcyclohexane are then added to the graduate from burettes in proportion such that the specimen is suspended in the solution. During the addition of the liquid, the graduate is shaken to secure thorough mixing. When the mixture just suspends the specimen, a portion of the liquid is transferred to a small test tube and placed on the platform of a Wesphal balance and the glass bob lowered therein. When the temperature shown by the thermometer in the bob is in the range 73–78° F., the balance is adjusted until the pointer is at zero. The value shown on the scale is taken as the specific gravity. With the balance standardized to read 1.00 with a sample of distilled water at 4° C., the specific gravity will be numerically equal to density in grams per cc.

The amount of propylene polymer in the grease depends upon the type of grease desired, hard or light, and the melt index of the polymer used. For example, the melt index of the highly crystalline propylene polymers which we can use can vary over a broad range, for example from about 0.1 to 25, although we prefer to work with those having a melt index from 1 to 6. A greater amount of polymer of a higher melt index can be incorporated into the grease with less stiffening effect. By varying both the melt index of the polymer and the polymer concentration, greases covering a wide range of consistencies are possible. Melt index is determined by ASTM D1238–57T except that five cuts are made and an average of these is determined. Broadly, the amount of propylene polymer can vary in the range of about 0.1 to 20 weight percent of the finished grease, although we prefer to employ from 5 to 12 weight percent highly crystalline propylene polymer in the greases of this invention.

It is also understood that other materials normally used in greases can be added to the compositions of this invention. For example, additives such as rust inhibitors, antioxidants, fillers, pigments, perfumes and the like can be employed. Some examples of such materials include propylenediamine, phenyl-$\alpha$-naphthylamine, phenothiazine, mica, asbestos, powdered lead, powdered zinc, talc, alumina, titanium dioxide, molybdenum disulfide, bentones, carbon black, nitrobenzene and the like. Generally, the amount of these modifiers is less than about 10 percent of the total weight of the grease. Various soaps normally used to thicken greases can also be used in conjunction with the polypropylene in amounts up to about 10 percent of the total grease. Commonly used soaps include metal salts of high molecular weight acids, for example, acids of 10 to 30 and preferably 16 to 24 carbon atoms, either synthetic or of animal or vegetable origin. Generally the alkali metal or alkaline earth metal salts of acids such as lauric, palmitic, oleic, stearic and the like are used. One of the preferred soaps is the lithium soap of 12-hydroxystearic acid. While soaps of a general nature can be used in the greases of our invention, it should be understood that the invention is of particular advantage in preparing soapless greases formed essentially from the polypropylene and refined mineral oil alone, with or without small amounts of additives such as rust inhibitors, antioxidants, and the like.

In preparing the greases of our invention, the propylene polymer is dispersed in the lubricants by heating the oils and polymer together with agitation. The solid polymer can be used either in pellet form or in a more finely divided state. Heating the oil to about 325 to 450° F. is usually required to form a satisfactory polymer-oil dispersion. Generally, the polymer is adequately dispersed within about 1–60 minutes.

The lubricating oil bases which are employed in the manufacture of the greases of this invention can be mineral, vegetable or animal in nature. We prefer that at least a major amount of the lubricating base oil be mineral in origin, preferably a refined oil having a viscosity of about 50–240 SUS at 210° F. With the same amount and melt index of the polymer, the less viscous oils will make lighter greases. Harder greases can be prepared from the more viscous types, for examples 70–240 SUS at 210° F. White mineral oil can be used to make non-staining greases which are suitable for lubricating machinery in the textile and food industry. We prefer paraffinic oils for the preparation of greases of low graininess.

The critical step in preparing the greases of this invention is the milling of the polymer-oil dispersion at a temperature between 150 and 245° F. We have found that milling the polypropylene greases within this temperature range provides lubricants which have work stability far superior to that which is obtained without this milling step. By "milling" we refer to a processing step that is well understood in grease manufacture.

Basically, it is severe agitation which produces substantial shearing in the mixture. Preferably the grease milling is carried out in colloid mills which are operated at high speeds with relatively close clearances, for instance on the order of 3000 to 9000 r.p.m. and 0.001 to 0.003 inch clearance. A number of suitable grease mills are commercially available. In some the grease is passed between closely spaced counterrotating disks. A preferred type employs tapered, grooved rotors and stators with adjustable clearance. Mills or homogenizers which produce shearing forces on the grease by passing the grease through one or more orifices under high pressure can also be used. A good discussion of grease milling has been made by Boner, "Manufacture and Application of Lubricating Greases," chapter 5, Reinhold Publishing Corp., New York (1954).

The greases can be cooled from the dispersing temperature to the milling temperature at any rate with or without agitation or they can be cooled to below milling temperature and reheated either prior to or during milling. The reheating to milling temperature when overcooling is used can be supplied by the mechanical working of the grease by the mill. In general, vigorous agitation or quick cooling with less vigorous agitation during the cooling step prior to milling produces a fibrous grease, while smooth, buttery greases result from slow cooling without agitation.

The following specific examples are intended to illustrate the advantages of the grease compositions of this invention, but it is not intended that the invention be limited to the specific embodiments shown therein.

EXAMPLE I

A series of runs were made in which a highly crystalline polypropylene prepared by an organometallic-catalyzed polymerization was employed as the sole thickening agent in the preparation of greases.

In these runs, the polypropylene had a density of 0.909 and 95% by weight of this polymer was insoluble in refluxing n-heptane.

The formulation for these runs was as follows.

| Component: | Weight percent |
|---|---|
| Oil [1] | 91.952 |
| Propylene polymer [2] | 8.00 |
| Antioxidant [3] | 0.008 |
| Rust inhibitor [4] | 0.04 |

[1] A commercial, solvent refined oil of a highly paraffinic type having the following properties: SUS viscosity at 100° and 210° F. of 4130 and 209.3, respectively; viscosity index of 97; neutralization number of 0.00; Conradson carbon of 0.9%; API gravity at 60° F. of 25.0; flash point of 615° F.; and a pour point of plus 15° F.
[2] Identified previously.
[3] 4,4'-thiobis(6-tert-butyl-m-cresol).
[4] A commercial product, Parabar 448, from the Enjay Company.

The greases were prepared in the following manner. The oil was heated to a temperature of about 350° F. The polymer was then added to the hot oil with stirring and while continuing heating of the oil to a temperature of about 400° F. so as to dissolve the polymer. The operation of dispersing the polymer with heating required about 30–40 minutes. Each mixture was then cooled to approximately 65–100° F. Each grease composition was then milled in a Charlotte colloid mill, Model ND-1, equipped with a Type P head and having a mill clearance of 0.001 inch. The temperature of milling was controlled by controlling the rate of cooling water circulation to the mill head. The milled greases were then deaerated by extrusion from the mill into an evacuated vessel maintained below about 20 mm. mercury absolute pressure.

The work stability of the products was then determined by the Cone Penetration Test Procedure of ASTM D217–52T. The results of these tests are expressed below as Table I.

Table I

| Run No. | Mill Outlet Temperature, °F. | ASTM Penetration | | ΔCP 60 XX Unworked |
|---|---|---|---|---|
| | | Unworked | 60 Strokes | |
| 1 | 160 | 242 | 260 | 18 |
| 2 | 185 | 235 | 260 | 25 |
| 3 | 194 | 228 | 257 | 29 |
| 4 | 200 | 218 | 248 | 30 |
| 5 | 201 | 223 | 252 | 29 |
| 6 | 205 | 220 | 257 | 37 |
| 7 | 210 | 216 | 251 | 35 |
| 8 | 214 | 220 | 251 | 31 |
| 9 | 220 | 211 | 250 | 39 |
| 10 | 245 | 220 | 257 | 37 |
| 11 | 260 | 145 | 253 | 108 |
| 12 | 275 | 140 | 243 | 103 |
| 13 | Unmilled | 120 | 223 | 103 |

The above table shows that the greases milled at temperatures at or below 245° F. have good stability, while those which are not milled or which are milled above 245° F. break down when worked.

EXAMPLE II

In a further series of tests, several of the greases of Example I were tested for performance in certain grease tests. In these tests the following procedure was used for determining the coefficient of friction and endurance life.

*Coefficient of friction.*—The coefficient of friction between a rotating steel ring and a steel test block when lubricated with the candidate greases was determined using a Timken E. P. tester manufactured by the Timken Roller Bearing Company, Canton, Ohio. Details of the apparatus and its operation have been described as "Proposed Method of Test for Measurement of Extreme Pressure Properties of Lubricants," ASTM Bull #228, pp. 28–32, February 1958. In this test, a steel ring is rotated against a steel test block while the grease is fed to the point of the contact of the test members. The grease at room temperature (70–80° F.) is fed at a constant rate by means of a pump. The mandrel speed is set at 800 r.p.m. and a load of a certain weight (5, 10 or 15 lbs.) is applied to the lever arm. The coefficient of friction is then computed from the equation:

$$\mu = \frac{9.45(B+R)}{10(A+C) - 2.5(B+R)}$$

where
$A$ = friction lever weight in pounds,
$R$ = sliding weight reading in pounds,
$B$ = load lever weight in pounds and
$C$ = load weight constant in pounds.

*Endurance test.*—The above described Timken E.P. tester was used to ascertain the endurance of the candidate greases. The endurance is a measure of the time the grease will prevent seizure under the prescribed conditions. The test is reported in detail in the NLGI Spokesman, vol. XX, No. 9, page 36, December 1956.

The results of these tests are expressed below as Table II.

*Table II*

| Candidate Grease | Coefficient of Friction Load | | | Timken Endurance Life, Minutes | Wheel Bearing Leakage, grams | Drop Point,[2] °F. |
|---|---|---|---|---|---|---|
| | 5# | 10# | 15# | | | |
| Example I—No. 5 | 0.062 | 0.049 | 0.048 | Not meas | [1] 7.4 | 305. |
| Example I—No. 4 | Not measured | | | 79 @ 14# load | Not meas | Not meas. |
| Example I—No. 6 | Not measured | | | 600 + @ 19# load | Not meas | Not meas. |

[1] ASTM D1263–53T except using 130 gram charge and 260° F.
[2] ASTM D566–42.

The data in Table II show that the polypropylene containing grease has a low coefficient of friction and the endurance life of the grease is excellent at higher loads. The polypropylene-containing grease also gave good results in the wheel bearing leakage test at high temperatures.

As will be apparent to those skilled in the art, various modifications can be made in our invention without departing from the spirit or scope thereof.

We claim:
1. A soapless grease comprising lubricating oil and from 0.1 to 20 weight percent based on the total lubricant of polypropylene having a density between 0.890 and 0.920 gram per cubic centimeter at 25° C., said lubricant having been milled at a temperature in the range of 150 to 245° F.

2. An improved soapless grease comprising refined mineral oil having a viscosity of 50 to 240 SUS at 210° F. and from 0.1 to 20 weight percent based on the total grease of polypropylene having a melt index in the range of 0.1 to 25 and a density between 0.890 and 0.920 gram per cubic centimeter at 25° C., said grease having been milled at a temperature in the range of 150 to 245° F.

3. An improved soapless grease comprising refined mineral oil having a viscosity of 50 to 240 SUS at 210° F. and from 5 to 12 weight percent based on the total grease of polypropylene having a melt index in the range 1 to 6 and a density between 0.890 and 0.920 gram per cubic centimeter at 25° C., said grease having been milled at a temperature in the range of 150 to 245° F.

4. A method of making a soapless bodied lubricant which comprises dispersing polypropylene having a density between 0.890 and 0.920 gram per cubic centimeter at 25° C. in lubricating oil at an elevated temperature above 245° F. to form a polymer-oil mixture, cooling said mixture and milling said mixture at a temperature in the range of 150 to 245° F.

5. A method of making an improved soapless grease which comprises dispersing from 0.1 to 20 weight percent polypropylene having a density between 0.890 and 0.920 gram per cubic centimeter at 25° C. and a melt index between 0.1 and 25 in a refined mineral oil having a viscosity of 50 to 240 SUS at 210° F. at a temperature in the range of 325 to 450° F. to form a polymer-mineral oil mixture, cooling said mixture, and milling said mixture at a temperature in the range of 150 to 245° F.

6. The method of claim 5 wherein said mixture is cooled with agitation to form a fibrous grease.

7. The method of claim 5 wherein said mixture is cooled without agitation to form a smooth, buttery grease.

8. The method of making an improved soapless grease which comprises dispersing at 325 to 450° F. from 5 to 12 weight percent of polypropylene having a melt index of 1 to 6 and a density between 0.890 and 0.920 gram per cubic centimeter at 25° C. in a refined mineral oil having a viscosity of 50 to 240 SUS at 210° F. to form a polymer-oil mixture, cooling said mixture, and milling said mixture at a temperature in the range of 150 to 245° F.

References Cited by the Examiner

UNITED STATES PATENTS 3,112,270  11/63  Mitacek et al. _____ 252—41

FOREIGN PATENTS 799,465  8/58  Great Britain.

OTHER REFERENCES

"The Manufacture and Application of Lubricating Greases," Boner, Rheinhold Publ. Co., N.Y., 1954, pages 225 and 226.

DANIEL E. WYMAN, *Primary Examiner.*

JULIUS GREENWALD, JOSEPH R. LIBERMAN, ALPHONSO D. SULLIVAN, *Examiners.*